Nov. 19, 1968    E. C. CRITTENDEN, JR    3,412,269
HYPERSONIC TRANSDUCER

Filed Nov. 24, 1965    2 Sheets-Sheet 1

Eugene C. Crittenden, Jr.
INVENTOR.

BY.

*Alfons Valukonis*
AGENT.

Nov. 19, 1968  E. C. CRITTENDEN, JR  3,412,269
HYPERSONIC TRANSDUCER
Filed Nov. 24, 1965  2 Sheets-Sheet 2
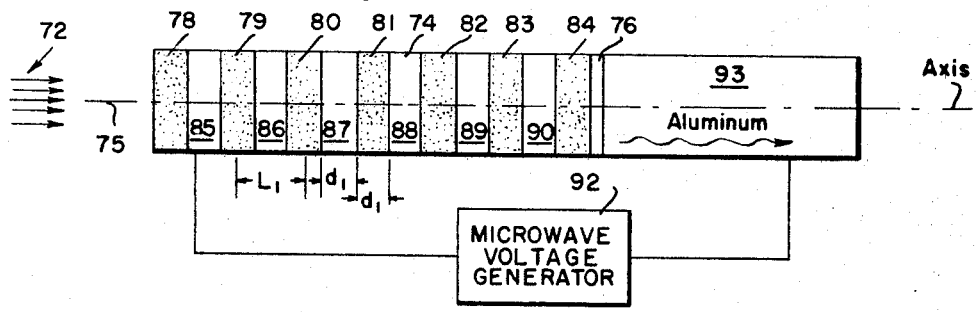
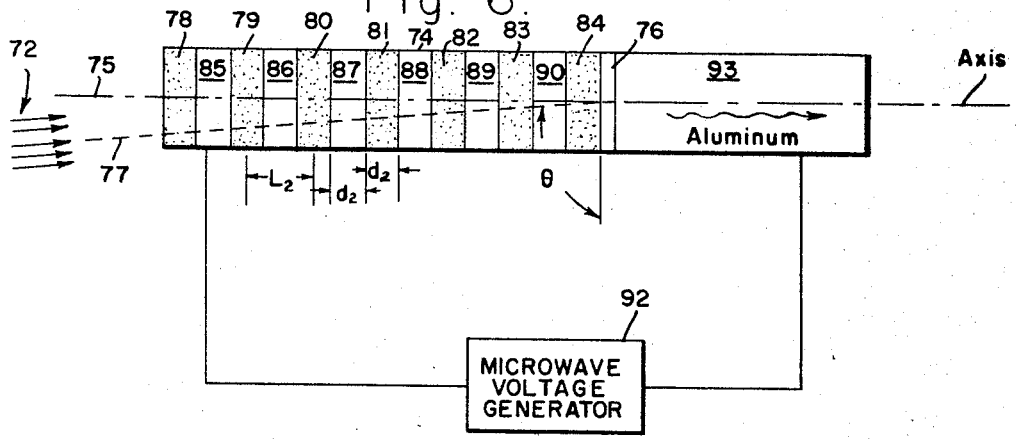
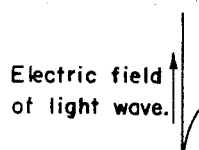
Eugene C. Crittenden, Jr.
INVENTOR.
BY.
AGENT.

United States Patent Office 3,412,269
Patented Nov. 19, 1968

3,412,269
HYPERSONIC TRANSDUCER
Eugene C. Crittenden, Jr., Monterey, Calif., assignor to TRW Inc., Redondo Beach, Calif., a corporation of Ohio
Filed Nov. 24, 1965, Ser. No. 509,583
6 Claims. (Cl. 310—8.1)

ABSTRACT OF THE DISCLOSURE

A transducer useful for operation at frequencies on the order of 100 mc. and lower provided with a slab of cadmium sulfide which is exposed to light having a wavelength of 5770 angstroms such that alternate dark and light bands are established along the acoustic propagation axis of the cadmium sulfide. The dark and light bands are regions of high and low electrical impedance, respectively. The widths of the bands are such as to establish mechanical resonance of the slab of cadmium sulfide with an applied electrical signal and are equal in length along the axis of sound propagation to one half wavelength of the acoustical signal to be generated. The dark and light bands are established by a slotted member positioned between the source of light and the cadmium sulfide. The slotted member is adjustable to regulate the widths of the dark and light bands to thereby provide for the tuning of the cadmium sulfide slab into mechanical resonance with the applied electrical signal. In another form of the transducer, useful at frequencies above 100 mc., there is employed wave interference phenomenon to produce standing optical waves in a slab of cadmium sulfide by introducing monochromatic light having a wavelength of 5770 angstroms into one end of the slab along its longitudinal axis. The opposite end of the slab is metallized to provide high reflectivity for the light. The light is directed into the cadmium sulfide slab either normal to the reflecting surface for maximum frequency operation or at some lesser grazing angle for lower frequency operation. Interference between the direct and reflected light produces standing waves in the slab with maxima of intensity spaced at half-wavelengths of the light. Dark and light bands of high and low electrical impedance are thus produced as in the first form of transducer. Tuning of this form of transducer is obtained by adjusting the angle of incidence that the light makes with the reflecting surface to produce mechanical resonance of the slab with an applied electrical signal.

---

This invention relates generally to transducers, and more particularly relates to novel transducer means for translating electromagnetic wave energy to ultrasonic wave energy up to and including microwave frequencies.

There is presently need in a number of applications for delaying signals of microwave frequencies by microseconds or even milliseconds. While these delays can be achieved by the use of conventional long-path electromagnetic delays, the physical dimensions of the delay systems can become cumbersome. For example, assume that a delay of 30 microseconds is desired by the use of a coaxial transmission line. The length of a typical coaxial line would be approximately 5940 meters. On the other hand, if the same desired delay were achieved by means of ultrasonic waves, whose speed is only about 5000 meters per second, the length of ultrasonic line required would be only 0.15 meter in length. Such a reasonable physical length suggests the ultization of ultrasonic devices.

Heretofore devices for translating electrical signals into acoustical signals, such as the magnetostrictive and the piezoelectric type, had several disadvantages. The main disadvantage of the magnetostrictive type of transducer is that it is restricted for efficient operation to frequencies below 100 kc.

The piezoelectric type transducer utilizes a quartz piezoelectric plate cut so as to oscillate in thickness, or in shear, when a varying electrical signal is placed across it. Such a transducer is a good coupler of electrical and acoustical signals only when actuated at frequencies near its mechanical resonance. Mechanical resonance occurs in the fundamental mode when the frequency of operation is such that a half-wavelength of the sound to be generated is equal to the thickness of the plate. It will be appreciated that for best operation at very high frequencies a very thin quartz plate must be cut. For example, at 10 mc., the required plate thickness would be 0.010 inch. Quartz plates of this thickness are readily available. However, no transducer of the required thickness for 1000 mc. operation, i.e., 0.0001 inch, is available.

Some success has been achieved in transducing at microwave frequencies ($10^9$ cycles/sec.) by the use of a free surface of a thick slab of piezoelectric material. But in this case the slab is nonresonant and only the first half-wavelength of the material is useful, along with a small contribution due to the gradient of the applied oscillating field in the material back of the free face.

Other devices which generate coherent mechanical vibrations at microwave frequencies are of the type wherein a rod of piezoelectric crystal material is inserted in a re-entrant cavity that subjects the rod to a microwave electric field. The discontinuity in piezoelectric stress at the rod free surface generates an ultrasonic wave, which then propagates in the crystal. While some acoustic coupling occurs in this type of device, the amount is insufficient to provide efficient transducer operations even with a high Q microwave cavity. The reason for this is that the coupling effectively utilizes only the small voltage occurring across about one quarter of an acoustic wavelength of the crystal. A more efficient transducer would utilize the entire voltage that appears across the cavity gap.

Another prior art device, somewhat similar to that described above, utilizes a diffusion layer on the surface of a crystal slab of cadmium sulfide in which the conductivity is lowered by diffusion of copper into the cadmium sulfide. An alternating current voltage which is applied to the slab of cadmium sulfide appears mostly across the thin insulating layer. This thin surface layer then acts as a transducer. This device, too, has the disadvantage of very low efficiency and is incapable of operating at microwave frequencies.

Briefly, in accordance with one embodiment of this invention, particularly useful for operation at lower frequencies, a transducer is provided wherein a slab of photoconductive, piezoelectric, semiconductor material is exposed to radiant energy of a predetermined wavelength such that alternate dark and light bands are established in the material along the axis of proposed sound propagation. The dark and light bands are regions of high and low electrical impedance, respectively. The widths of the bands or regions are predetermined to establish mechanical resonance of the material with the applied electrical signal and are equal in width along the axis of sound propagation to one half-wavelength of the acoustical signal to be generated. The dark and light bands in the material are established by means of a slotted member interposed between the source of radiant energy and the material. The slotted member is rotatable to regulate the widths of the dark and light regions to thereby provide means for tuning the material into mechanical resonance with the applied voltage.

In another embodiment useful at higher frequencies, light interference phenomenon is utilized to produce standing optical waves in the photoconductive, piezoelectric, semiconductor material. To this end a radiant energy beam of predetermined wavelength is directed into one end of the material. The opposite end of the crystal material is metallized so as to provide high reflectivity of light waves. The beam is directed into the crystal either normally to the reflecting surface for maximum frequency operation or at some lesser grazing angle for lower frequencies. Interference between the direct and reflected beams produces standing waves in the crystal medium with maxima of intensity spaced at half-wavelengths of the radiant energy. As in the first embodiment, dark and light bands or regions, of high and low electrical impedance, are produced so that effective transducing to ultrasonic waves whose wavelength equals one half of the wavelength of the incident light can be accomplished from electrical signals. Tuning of this embodiment to the desired frequency to be transduced is obtained by adjusting the angle of incidence that the radiant energy beam makes with the reflecting surface to produce mechanical resonance of the crystal material with the applied electrical signal.

Accordingly, an object of this invention is to provide novel transducer apparatus which overcomes the disadvantages of previous devices and is capable of translating electrical energy to acoustical energy up to and including microwave frequencies.

Another object of this invention is to provide transducer apparatus incorporating novel energy translating apparatus capable of being tuned into mechanical resonance with the applied electromagnetic energy to provide improved energy translation.

Still another object of this invention is to provide novel transducer apparatus which provides improved energy translation and eliminates the need for very thin crystal transducers for efficient operation at microwave frequencies.

These and other objects of the present invention will become apparent from the following specification when taken in connection with the accompanying drawings in which:

FIG. 4 is a side elevation of another embodiment of the invention;

FIG. 5 is a showing of graphs representing operation of the embodiment of FIG. 4; and FIG. 6 is similar to FIG. 4 but depicts use of the second embodiment at lower frequencies.

Figure 1:
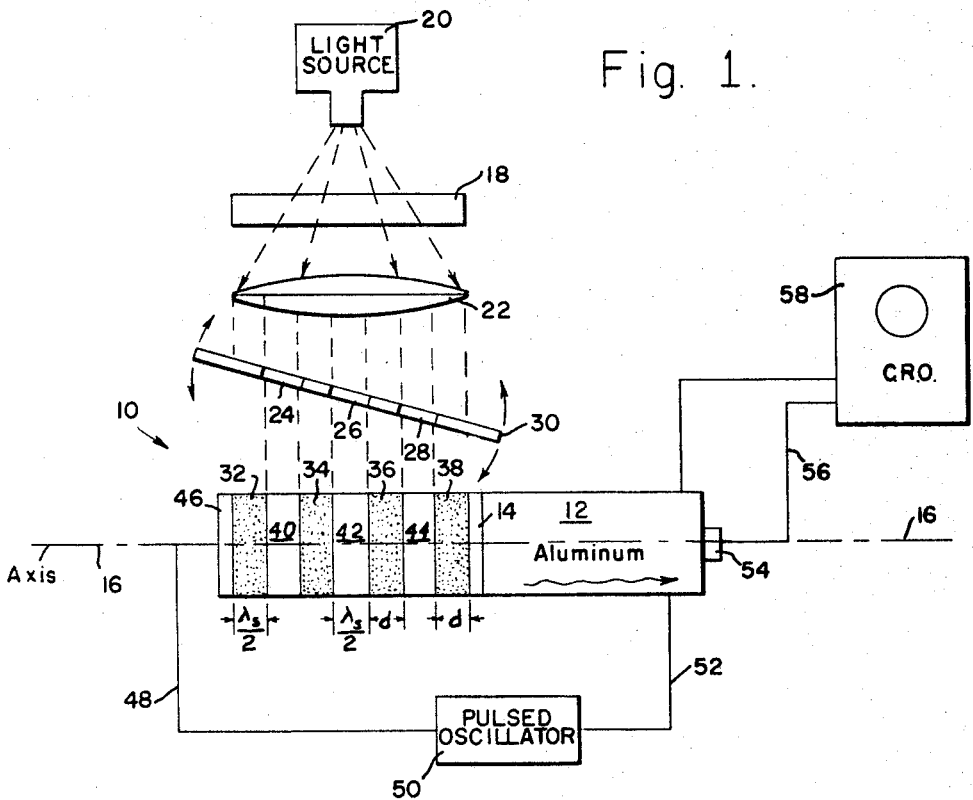
FIG. 1 is in part a schematic showing and in part a block diagram circuit illustrating one embodiment of the invention.

Referring now more particularly to the drawings and in particular to FIG. 1 wherein there is shown one embodiment of the invention particularly useful for operation at lower frequencies on the order of 100 mc. and below, the numeral 10 designates a polished, rectangular slab of photoconductive, piezoelectric, semiconductor material. The material 10 should have low mobility of carriers in order to reduce carrier diffusion rates. Diffusion would tend to spread the bunching of carrier produced by the use of incident light in the practice of the invention, as will be more fully appreciated, and would reduce the sharpness of division between the high and low impedance regions. Applied electric fields will also cause motion of the carriers thus making it desirable to reduce this behavior by the use of a material 10 with low mobility of carriers. Cadmium sulfide has been found to be a suitable material in the practice of this invention. The rod 10 is suitably mounted on a rectangular rod of aluminum 12, which serves as an acoustic wave transmission medium, as by bonding with a layer of indium 14, and is oriented in the proper direction to produce either longitudinal or transverse acoustic waves depending on which is desired.

A suitable filter 18 selects light of the appropriate wavelength from a source of white light 20. In this embodiment wherein cadmium sulfide is used as the semiconductor material 10, light having a wavelength of 5770 angstroms is selected (the green line of the mercury spectrum), where the band gap corresponds to light of 5170 angstroms.

A lens 22 concentrates the light from filter 20 to provide parallel beams which are allowed to pass through slits 24, 26, and 28 of a grid 30 positioned between the lens and the semiconductor 10. The grid 30 is so constructed and arranged that light only passes through the slits 24, 26, and 28 to the semiconductor 10 and establishes alternate dark regions 32, 34, 36, 38 and illuminated semitransparent regions 40, 42, and 44, each region both dark and illuminated having a width $d$ along the axis 16 which is equal to one half the acoustic wavelength $\lambda_s$ of the sound to be generated. As shown, the grid 30 is tiltable to vary the widths $d$ for tuning the semiconductor 10 to mechanical resonance. Because of the photoconductive property of cadmium sulfide, regions such as 32 and 40 are striations of high and low resistance, respectively.

A thin film 46 of indium is provided suitably bonded on the free end of the semiconductor 10 to which one lead 48 from a pulsed oscillator 50 is connected. The other lead 52 from the oscillator 50 is connected to the aluminum rod 12 as shown. The pulsed oscillator 50 is conventional and can be one which provides pulses of alternating current electrical signals at predetermined pulse rates and frequencies.

An assembly is provided for detecting and displaying acoustic waves generated in the semiconductor 10 and aluminum rod 12 and consists of a quartz transducer 54, suitably mounted on the free end of aluminum rod 12 to which one input lead 56 is connected thereto as well as to a conventional cathode ray oscilloscope 58. The other lead 60 from the oscilloscope 58 is suitably attached as by bonding to the aluminum rod 12, as shown.

Figure 2:
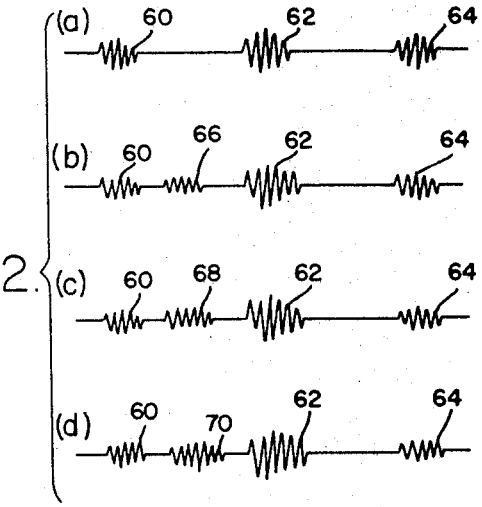
FIG. 2 is a showing of oscilloscope waveforms representing the operation of the embodiment of FIG. 1.

Operation of the embodiment of the invention depicted in FIG. 1 can best be described as follows:

Assume initially that no light is caused to emanate from the light source 18 and accordingly the crystal of cadmium sulfide 10 is completely dark. Also assume that the oscillator 50 is caused to operate to provide electrical pulses, for example, periodic bursts of 5 cycles of an 18 mc. signal. Referring now to FIG. 2(a), there can be seen three sound pulses 60, 62, and 64 which originate in the semiconductor 10 and aluminum rod 12 and are caused to appear on the screen of oscilloscope 58. The pulse 60 on the left is the sound pulse originating at the interface between the semiconductor 10 and the aluminum rod 12. Such a sound pulse always occurs at any region in which there is a piezoelectric strain. The later center pulse 62 is the pulse reflected from the top surface of the cadmium sulfide crystal 10. Since discontinuity exists in the piezoelectric strain such a pulse is to be expected. The third pulse 64 is the sound pulse obtained as a reflection of the interface pulse 60 from the left surface of the crystal 10. The pulse 64 has traveled through the cadmium sulfide material, been reflected from the left surface, and has then propagated through the aluminum rod 12. Further reflections would also occur, but would occur at times later than shown in FIG. 2.

Since there is no light on the crystal 10 and there are no striations or regions of dark and light, as previously described, no additional sound pulses are expected or seen to be generated in the center of the crystal 10.

Assume now that the conditions are as just previously described, only now the source of light 18 is turned on and light is allowed to pass only through the slit 26 to form the light striation region 42 near the center of the semiconductor 10. The other slits 24 and 28 are adapted to be covered in some suitable manner (not shown) to block passage of light and render the rest of the crystal dark. Referring to FIG. 2(b) it can be seen that an additional sound pulse 66 has been generated in the center of the semiconductor 10. It can also be seen that the pulse 66 is shown as being somewhat weaker than the pulse 60 originating at the interface. It is believed that this pulse weakness probably occurs because the interface as well as the left surface of the crystal are not completely ohmic because of the presence of surface impurities.

Referring to FIG. 2(c) it can be seen that if another slit 24 is allowed to pass light to the semiconductor 10 to form yet another light striation 40, a sound pulse 68 of increased amplitude and pulse length is generated. Finally, if the remaining slit 28 also is allowed to pass light to the semiconductor 10 to form the light region 44, a pulse 70 of additionally increased amplitude and duration is recorded on the oscilloscope 58, as shown in FIG. 2(d). Thus, it can be readily appreciated that as the number of striations formed in the semiconductor 10 increases, the amplitudes and pulse lengths of such illustrative sound pulses as 66, 68, and 70 also increase and the effect of a large number of half-wave transducers can be achieved.

Tilting of the shadowing grid 30, as shown, to increase or decrease the widths $d$ serves to tune or mechanically resonate the crystal 10 to provide maximum coupling between the applied electrical signal and the generated acoustical pulse, such as pulse 70.

Figure 3:
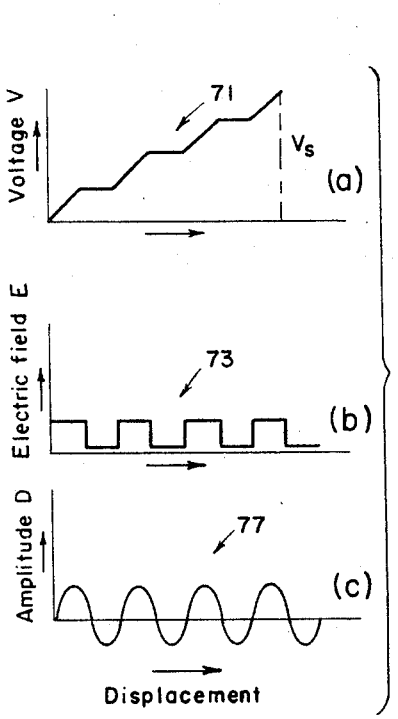
FIG. 3 is a showing of graphs also representing operation of the embodiment of FIG. 1.

As a further explanation of operation of the embodiment it will be appreciated that at the instant when the applied alternating current voltage of the oscillator 50 has a maximum value $V_s$, the electrical potential V and the electric field E in the crystal 10 will vary as a function of the distance along the axis of sound propagation as exemplified by the graphs 71 and 73 of FIGS. 3(a) and 3(b), respectively. The oscillating electric field E will drive the crystal 10 into standing acoustic waves 77, as shown in FIG. 3(c). It can be seen that the alternate half-wavelengths of the acoustic wave 77 are driven by the electric field E. This makes for cumulative excitation which produces the large coupling effect described above. If the electric field E did not vary with displacement along the axis of wave propagation as shown, the adjacent wavelengths of the wave train 77 would be driven such that the cumulative effect would be one of cancellation and no coupling would result, except that due to the last half-wavelength at the ends of the material 10.

Since ultrasonic wavelengths at microwave frequencies are very short, diffraction phenomena will prevent the utilization of the shadowing grid 30 of the embodiment of FIG. 1 at the frequencies above approximating 100 mc. The second embodiment of this invention shown in FIG. 4 accordingly employs wave interference phenomenon to produce standing optical waves in semiconductor material. As shown in FIG. 4 monochromatic parallel light beam 72 is directed into one end of a photoconductive piezoelectric crystal 74, such as cadmium sulfide, or the like, along its longitudinal axis 75. The opposite end of the crystal 74 is metallized at 76, so as to provide high reflectivity to the parallel light 72. The parallel light beam 72 can have a wavelength of 5770 angstroms as in the embodiment of FIG. 1. Interference between the direct and reflected beams produces standing waves, FIG. 5(a), within the crystal 74, with alternate dark regions 78-84, and light regions 85-90, of high and low electrical resistivity, respectively, FIG. 5(b). As in the embodiment of FIG. 1, the microwave electric field of FIG. 5(c) generated by a microwave voltage generator 92 serves to drive alternate half-wavelengths of the acoustic wave to produce cumulative excitation and good coupling between the electrical signal and the generated acoustic signal results. With the slab 74 fashioned from cadmium sulfide and monochromatic light 72 having a wavelength of 5770 angstroms, the spacing of the standing wave intensity maxima is given by the expression:

$$L_1 = 2d_1 = \frac{\lambda_1}{2n} = \frac{(5770)(10^{-8})}{2 \times 2.67} = 1080 \times 10^{-8} \text{ cm.}$$

where $L_1$ is the spacing of standing wave maxima, $d_1$ is equal to one half the wavelength of the sound to be generated, $\lambda_1$ is the wavelength of light 72, and $n$ is the index of refraction of cadmium sulfide.

Furthermore, the frequency of the signal to be generated by the generator 92 for resonance and maximum coupling is given by the expression:

$$f_1 = \frac{v_s}{\lambda_s} = \frac{v_s}{L_1} = \frac{(4.3)(10^5)}{(1080)(19^{-8})} = 40 \times 10^9 \text{ c.p.s.}$$

where $f_1$ is the frequency of the signal generated by oscillator 92, $v_s$ is the velocity of sound in cadmium sulfide for longitudinal waves, and $\lambda_s$ is the wavelength of generated sound.

Referring to FIG. 6, lower frequencies can be attained with the embodiment of FIG. 4 by allowing oblique incidence of the light 72 on the reflective metallized end 76 of maxima of intensity spacing is given by, $$L_2 = 2d_2 = \frac{\lambda_1}{2n \sin \theta} = \frac{v_s}{f_2}$$

where $L_2$ is the spacing of standing wave maxima, $d_2$ is equal to one half of the wavelength of sound waves to be generated, $\theta$ is the grazing angle of the beam 72 with the reflecting surface 76, and $f_2$ is the frequency of the signal to be generated by the generator 92 for maximum resonant coupling.

As an example, for $\theta = 15°$, and $\lambda_1 = 5770$ angstroms, the resonant frequency would be:

$$f_2 = \frac{2nv_s \sin \theta}{\lambda_1} = \frac{2(2.67)(4.3)(10^5)(2.58)}{5770 \times 10^{-8}} = 10 \times 10^9 \text{ c.p.s.}$$

Precise tuning of the embodiment of FIG. 4 can be accomplished by adjusting the angle of incidence of the beam 72 with the reflecting surface 76 to a point wherein resonance occurs. It will be appreciated that where the beam 72 is directed into the crystal 74 substantially along the axis of sound propagation some slight angular adjustment of the beam with respect to the axis 75 will be necessary to achieve resonant operation. Of course, where the beam 72 is directed along the path 77 to intercept the reflecting surface 76 at the angle $\theta$, some incremental angular adjustment about the path 77 would be required to effect resonant operation.

It will be appreciated that the embodiment of FIG. 4 is particularly adapted for use at the higher microwave frequencies, although an increase in the wavelength $\lambda_1$ of the light utilized, a reduction in the index of refraction $n$, and a reduction in $v_s$ will establish lower operating frequencies. In practical application the lower operating frequency limit of the embodiment of FIG. 4 would be at about 100 mc. Below this level the embodiment of FIG. 1 becomes more useful for lower frequencies of sound generation.

These embodiments of the invention are illustrative of features of the invention only and are not to be considered restrictive thereof.

The embodiments of the invention in which an exclusive property or privilege is claimed are defined as follows:

1. In combination:
    a piezoelectric semiconductor material having an acoustic wave propagation axis, and
    means for generating a plurality of stationary adjacent alternate regions of high and low electrical resistance in the material, said regions each being equal in width along said axis to one half the wavelength of an acoustic wave to be propagated along said axis by the application of a voltage signal to said material.

2. A combination as set forth in claim 1, said material being photoconductive, and said means comprising radiant energy means producing a radiant energy beam of predetermined wavelength to develop dark and light bands at said regions.

3. A combination as set forth in claim 2, said radiant energy means comprises a grid interposed between said material and a source of radiant energy having said predetermined wavelength, said grid having slits equal in number to said light bands.

4. A combination as set forth in claim 3, said grid being adjustable to alter the widths of said bands to tune the material into resonance with the voltage signal.

5. A combination as set forth in claim 3, said material having a reflecting surface at one end of the axis, and said radiant energy beam of predetermined wavelength is directed into the other end of the material at a predetermined angle of incidence with said reflecting surface.

6. A combination as set forth in claim 5, said beam of radiant energy being angularly adjustable to alter the widths of said bands to tune the material into resonance with the voltage signal.

References Cited

UNITED STATES PATENTS

| | | | |
|---|---|---|---|
| 3,185,942 | 5/1965 | White | 310—8 |
| 3,136,893 | 6/1964 | Liben | 333—30 |
| 2,794,863 | 6/1957 | Roosbroeck | 333—72 |
| 3,274,406 | 8/1966 | Sommers | 310—8.1 |

J. D. MILLER, *Primary Examiner.*